United States Patent [19]
Jambor et al.

[11] Patent Number: 5,647,630
[45] Date of Patent: Jul. 15, 1997

[54] MOTOR VEHICLE HAVING AN AT LEAST PARTIALLY RETRACTABLE ROOF

[75] Inventors: Arno Jambor, Vaihingen/Enz; Dieter Guertler; Mark Muehlhausen, both of Stuttgart, all of Germany

[73] Assignee: Mercedes-Benz AG, Stuttgart, Germany

[21] Appl. No.: 499,816

[22] Filed: Jul. 10, 1995

[30] Foreign Application Priority Data

Jul. 8, 1994 [DE] Germany ............ 44 24 189.5
Oct. 26, 1994 [DE] Germany ............ 44 38 191.3

[51] Int. Cl.⁶ ............................................. B60J 7/12
[52] U.S. Cl. .................................... 296/108; 296/116
[58] Field of Search ............................. 296/108, 107, 296/116, 136, 65.1, 37.16

[56] References Cited

U.S. PATENT DOCUMENTS

| | | |
|---|---|---|
| 4,270,790 | 6/1981 | Curotto ............... 296/37.16 |
| 4,729,592 | 3/1988 | Tuchiya et al. . |
| 4,854,634 | 8/1989 | Shiraishi et al. . |
| 5,429,409 | 7/1995 | Corder et al. ............. 296/108 |
| 5,498,051 | 3/1996 | Sponsler et al. ............. 296/95.1 |

FOREIGN PATENT DOCUMENTS

| | | |
|---|---|---|
| 0 275 184 | 7/1988 | European Pat. Off. . |
| 33 17 603 | 11/1984 | Germany . |
| 36 39 377 | 5/1987 | Germany . |

*Primary Examiner*—Joseph D. Pape
*Attorney, Agent, or Firm*—Evenson, McKeown, Edwards & Lenahan, P.L.L.C.

[57] ABSTRACT

A motor vehicle is provided with an at least partially retractable roof and a rear seat area provided with a seat arrangement to be used as a storage space into which the retractable roof area can be moved from above, whereby an occupying of the rear seats becomes possible only when the roof is closed. In order to obtain more constructive freedom in designing the rear seat area and the roof coordinated with the rear seat area, at least one part of the seat arrangement can be displaced from an in-use position which obstructs areas of the storage space of the roof into a not-in-use position which exposes the space for the lowering of the roof.

10 Claims, 1 Drawing Sheet

MOTOR VEHICLE HAVING AN AT LEAST PARTIALLY RETRACTABLE ROOF

BACKGROUND AND SUMMARY OF THE INVENTION

This invention relates to a motor vehicle having an at least partially retractable roof and, more particularly, to a motor vehicle which includes an at least partially retractable roof and a rear seat area provided with a seat arrangement. The rear seat area is to be used as a storage space into which the retractable roof can be moved from above, whereby occupying the rear seats only becomes possible when the roof is closed.

A motor vehicle of the type described above is known, for example, from German Patent document DE 33 17 603 A1. However, it is a disadvantage of this motor vehicle that a sufficient amount of space must be provided in the rear seat area to permit housing the retracted roof without any problems. This therefore considerably limits the constructive freedom in the designing of the rear seat area and the roof, and makes a space-saving measurement concept in the rear seat area hardly possible.

There is therefore needed a motor vehicle of the above-mentioned type that provides a larger constructive freedom in designing the rear seat area and a correspondingly coordinated roof.

According to the present invention, these needs are met by a motor vehicle which includes an at least partially retractable roof and a rear seat area provided with a seat arrangement. The rear seat area is to be used as a storage space into which the retractable roof can be moved from above, whereby occupying the rear seats only becomes possible when the roof is closed. A portion of the seat arrangement, i.e., the rear seat bench, can be displaced from an in-use position which in areas obstructs the storage space of the roof into a not-in-use position which exposes the space, thus allowing the lowering of the roof.

It is a further advantage of the present invention that a seat backrest part of the seat arrangement can be folded down onto a seat cushion part situated in front thereof.

It is also advantageous that, when the seat parts are folded above one another, the seat arrangement can be folded into a steeply upright position behind the seat backrests of the front seats.

A still further advantage according to the present invention provides a through-loading opening to a trunk portion via the forward folding of the seat backrest part located in front of the trunk portion.

Yet another advantage of the present invention provides the seat arrangement with an assigned headrest arrangement. Each headrest of the headrest arrangement is coupled with respect to motion with the roof via an arrangement in the rear wall area of the roof.

Yet another advantage of the present invention provides the roof as a folding roof composed of two firm roof shells, a forward roof shell being connected with a rearward roof shell in an articulated manner. The rearward roof shell can be folded down and lowered into the storage space in such a manner that the forward roof shell, positively connected to the rearward roof shell, can be lowered into a deposited position which largely covers the opening of the storage space.

Other objects, advantages and novel features of the present invention will become apparent from the following detailed description of the invention when considered in conjunction with the accompanying drawings.

DETAILED DESCRIPTION OF THE DRAWINGS

Figure 1:
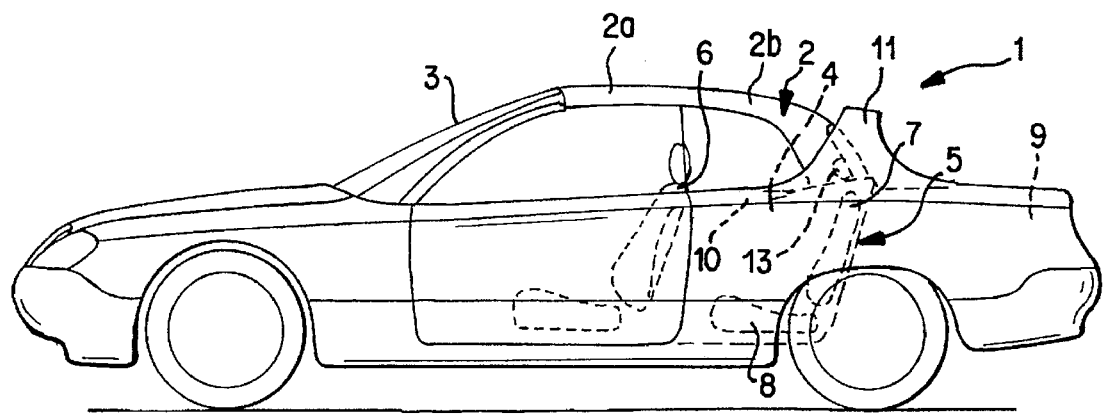
FIG. 1 is a schematic lateral view of a convertible vehicle when the roof is closed.

A convertible vehicle illustrated in FIG. 1 is provided with a firm roof 2 which, when the convertible 1 is closed, covers its interior. In the illustrated embodiment, the roof has two firm roof shells 2a and 2b which are connected with one another in an articulated manner. After the unlocking of forward locks, by which the roof shell 2a is fastened to the frame of the windshield 3, the roof shell 2b can be folded down into a storage space 4. For this purpose, the roof shell 2b is disposed so that it can be swivelled about a horizontal transverse axis 10 of the vehicle.

However, when the roof 2 is closed, the advancing path of the roof shell 2b is obstructed by a rear seat bench 5. The rear seat bench 5 is arranged at a distance behind the seat backrests 6 of the front seats in the storage space of the roof 2. The rear seat bench 5 has two folding seats.

Figure 2:
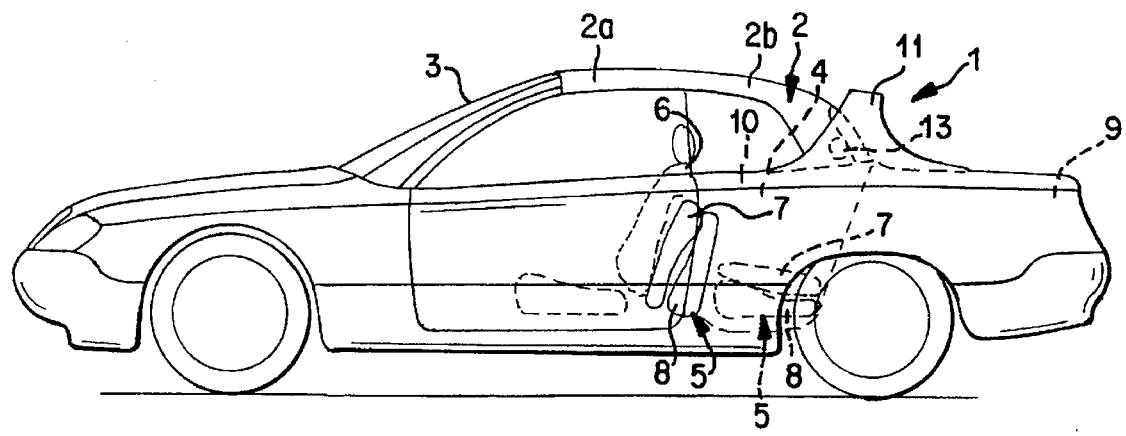
FIG. 2 is a schematic lateral view according to FIG. 1 in which the rear seat bench is folded down.

In order to provide space for the retracting operation and for the housing of the roof shell 2b, the backrest part 7 of the rear seat bench 5 can first be folded down toward the front onto the seat cushion part 8, after which the seat parts rest on one another while largely overlapping, as indicated in FIG. 2 by broken lines. Then, the seat cushion part 8, together with the backrest part 7 folded onto it, is folded toward the front of the vehicle into a steep upright not-in-use position closely behind the front seat backrest 6. After this folding, both parts 7 and 8 will be situated approximately in parallel to the seat backrest 6, behind the backrest 6, as indicated by solid lines in FIG. 2. The folding mechanism of a rear seat bench in general is known from motor vehicles having a variable interior and is therefore not explained in detail.

Advantageously, due to the forward-folding operation of the seat backrest part 7, a through-loading opening is exposed in a manner known per se to a trunk 9 situated behind the storage space 4. When the seat backrest part 7 is folded toward the front, the length of the cargo space of the trunk 8 can therefore be extended to the seat backrests 6. Therefore, when the roof 2 is closed, a variable interior is available for different types of transport tasks.

Figure 3:
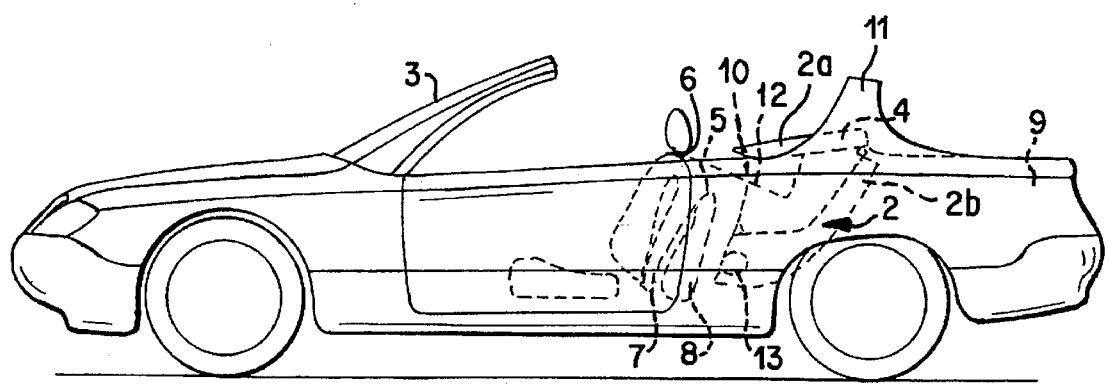
FIG. 3 is a schematic lateral view in which the roof is open and partially retracted.

When the rear seat bench 5 is folded forward and fixed in the not-in-use position, the rearward roof shell 2b can be lowered under a rollover bar 11, spanning the roof width, into the exposed storage space 4. In this case, the roof shell 2b is moved about the transverse axis 10 of the vehicle on a circular path. Through this retracting operation, the forward roof shell 2a is taken along, as illustrated in FIG. 3, and is lowered into a deposited position in which it largely covers the upward-facing opening of the storage space 4 and thus acts as a cover.

In order to achieve an advancing lowering of the forward roof shell 2a in the sense of its parallel displacement, the forward roof shell 2a may be controlled by way of bent guide levers 12. The bent guide levers 12 are pivotally connected on the vehicle body approximately in the center on the forward roof shell 2a and at a distance in front of the transverse axis 10 of the vehicle body. In this case, the rearward roof shell 2b, the forward roof shell 2a and the guide lever 12 form a parallelogram-type linkage by which a forced kinematic movement is ensured.

Furthermore, two headrests 13 are assigned to the rear seat bench 5 and are mounted above the respective pertaining seat in the rear wall area of the rearward roof shell 2b. In this case, the mounting may take place laterally on the roof pillars or on the rearward wall of the roof shell 2b. The rearward wall of the roof shell 2b is provided with a rear window. It is also advantageous to arrange the headrests 13 in a vertically adjustable manner on the roof shell 2b. By means of the fastening of the headrests 13, the headrests 13 participate in the folding movement of the rearward roof shell 2b and, during the closing of the roof 2, are therefore moved from their lowered not-in-use position into their in-use position and vice-versa.

The roof 2 may be retractable manually or by pushing a button through the use of an auxiliary motor drive. Likewise, it would be possible to also carry out the forward-folding operation of the rear seat bench 5 using an auxiliary force, in which case this function may be controlled along with the operation of the roof. In this case, a seat occupation recognition sensor for the rear seat bench 5 may be provided in order to increase the operational reliability.

It is understood that the invention is not only suitable for motor vehicles having a two-part firm roof and a retractable roof portion, but on the contrary, the firm roof may also be constructed in one piece and may be partially or completely retractable. In addition, instead of a firm roof, a fabric top folding top of a known type may be provided. In the case of folding roofs or tops which may be retracted into a storage space having little depth, in addition, the required room in the storage space, if required, may be freed by a forward-folding of the backrest part of the rear seat bench.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle, comprising:
   an at least partially retractable roof for the motor vehicle;
   a rear seat area having a seat arrangement, said rear seat area being used as a storage space into which said retractable roof is moved from above said storage space, whereby rear seats of the seat arrangement can only be occupied when the retractable roof is closed;
   wherein a portion of said seat arrangement is displaceable from an in-use position which obstructs areas of said storage space of said retractable roof into a not-in-use position which exposes said storage space allowing the lowering of the retractable roof;
   wherein a seat backrest part of said seat arrangement is folded down onto a seat cushion part situated in front of the seat backrest part; and
   wherein, when the seat backrest part and seat cushion part are folded above one another, said seat arrangement is folded into an upright position behind seat backrests of front seats of the motor vehicle.

2. A motor vehicle according to claim 1, wherein, when the seat backrest part and seat cushion part are folded above one another, said seat arrangement is folded into an upright position behind seat backrests of front seats of the motor vehicle.

3. A motor vehicle according to claim 1, wherein a through-loading opening is exposed to a trunk of the motor vehicle via the forward folding of the seat backrest part.

4. A motor vehicle, comprising:
   an at least partially retractable roof for the motor vehicle;
   a rear seat area having a seat arrangement, said rear seat area being used as a storage space into which said retractable roof is moved from above said storage space, whereby rear seats of the seat arrangement can only be occupied when the retractable roof is closed;
   wherein a portion of said seat arrangement is displaceable from an in-use position which obstructs areas of said storage space of said retractable roof into a not-in-use position which exposes said storage space allowing the lowering of the retractable roof;
   wherein said seat arrangement further comprises an associated headrest arrangement; and
   wherein each headrest of the associated headrest arrangement is movably coupled with the retractable roof in a rear wall area of the retractable roof.

5. A motor vehicle, comprising:
   an at least partially retractable roof for the motor vehicle;
   a rear seat area having a seat arrangement, said rear seat area being used as a storage space into which said retractable roof is moved from above said storage space, whereby rear seats of the seat arrangement can only be occupied when the retractable roof is closed;
   wherein a portion of said seat arrangement is displaceable from an in-use position which obstructs areas of said storage space of said retractable roof into a not-in-use position which exposes said storage space allowing the lowering of the retractable roof; and
   wherein the retractable roof is a folding roof including two firm roof shells, a forward one of said two firm roof shells being fixedly connected with a rearward one of said two firm roof shells in an articulated manner.

6. A motor vehicle according to claim 5, wherein a seat backrest part of said seat arrangement is folded down onto a seat cushion part situated in front of the seat backrest part.

7. A motor vehicle according to claim 5, wherein said seat arrangement further comprises an assigned headrest arrangement.

8. A motor vehicle according to claim 5, wherein the rearward roof shell is folded down and lowered into said storage space in such a manner that said forward roof shell, pivotally connected to said rearward roof shell, is lowered into a deposited position substantially covering an opening of said storage space.

9. A motor vehicle according to claim 5, wherein a through-loading opening is exposed to a trunk of the motor vehicle via the forward folding of the seat backrest part.

10. A motor vehicle according to claim 7, wherein each headrest of the assigned headrest arrangement is movably coupled with the retractable roof via an arrangement in a rear wall area of the retractable roof.

* * * * *